United States Patent [19]

Koller

[11] Patent Number: 4,928,731
[45] Date of Patent: May 29, 1990

[54] AIRCRAFT TOILET TANK FILLING VALVE ASSEMBLY

[75] Inventor: Floyd G. Koller, Dayton, Ohio

[73] Assignee: Auto-Valve, Inc., Madison Township, Ohio

[21] Appl. No.: 369,957

[22] Filed: Jun. 22, 1989

[51] Int. Cl.⁵ ............................................. F16K 15/18
[52] U.S. Cl. .................... 137/599; 137/301
[58] Field of Search .................. 137/599, 599.2, 272, 137/301, 302, 110, 614.2

[56] References Cited

U.S. PATENT DOCUMENTS

| | | | |
|---|---|---|---|
| 806,268 | 12/1905 | Koontz | 137/599.1 X |
| 1,297,001 | 3/1919 | O'Shields | |
| 1,708,060 | 4/1929 | Harrison et al. | 137/599 X |
| 1,827,470 | 10/1931 | Harrison et al. | 137/599 X |
| 4,642,037 | 2/1987 | Fritchman | |
| 4,702,274 | 10/1987 | Kramer | |

*Primary Examiner*—Stephen M. Hepperle
*Attorney, Agent, or Firm*—Roger S. Dybvig

[57] ABSTRACT

A toilet tank filling valve assembly to be mounted on an aircraft (10) includes an elongated main body (32) for defining an elongated passage (34) and first and second longitudinally spaced lateral passages (36 and 38). A one piece elongated bypass casing (56) defines an elongated bypass channel (58) and includes a bypass-casing oblong sealing facing (64) corresponding to a main-body oblong sealing facing (66) surrounding the first and second lateral passages. The elongated channel forms a passage between the first and second lateral passages. A moveable valve member (46) is mounted in a valve cavity (40) of the elongated main body at an intersection of the elongated passage for being placed in an open position to allow flow through the elongated passage or to a closed position for closing the elongated passage but allowing flow between a first end of the elongated passage and the first lateral passage. A one-way check valve (74) formed from a gasket between the main body and the one piece bypass casing allows fluid to flow from the first lateral passage to the elongated passage, but not in the reverse direction. The first end of the elongated passage is coupled to a toilet tank (14) and the second end of the elongated passage is coupled to a source (12) of pressurized toilet fluid.

8 Claims, 2 Drawing Sheets

AIRCRAFT TOILET TANK FILLING VALVE ASSEMBLY

BACKGROUND OF THE INVENTION

When servicing aircraft between flights, it is often necessary to refill toilet tanks with toilet fluid from trucks or other toilet-fluid sources. When doing this, an operator provides a pressurized source of toilet fluid at a toilet tank fitting nozzle to which the operator can couple the source. In this respect, the fitting is usually near a bottom of an aircraft fuselage, inside a service door or the like, which can be reached by an operator from outside the aircraft. However a toilet tank for storing the toilet fluid in the aircraft is located in a different place, the fitting being attached to the toilet tank via a pipe, hose, or the like. It is beneficial for the operator to be able to close a valve on the fitting in order to terminate flow of pressurized toilet fluid to the toilet tank when the toilet tank is full, as can be determined from within the aircraft, thus, most such fittings have levers, or the like thereon so that valves thereof can be selectively closed. However, such structure produces a problem in that the fitting and some of the pipe extending between the fitting and the toilet tank are exposed to outside temperatures. During winter and/or when the aircraft is flying at high altitudes, toilet fluid left in the fitting and in the pipe between the fitting and the toilet tank freezes, which can crack or split the pipe. Thus, it is an object of this invention, to provide an aircraft toilet tank filling valve assembly to be used as such a fitting which can be selectively closed by an operator, but which does not leave a residue of toilet fluid in the valve assembly nor in the pipe between the fitting and the toilet tank.

It has been suggested to solve this above-described problem by having a return bypass system in conjunction with a rotary ball valve system. That is, according to this suggestion, a bypass pipe is installed above the fitting with a one-way valve therein to allow fluid to automatically flow from the pipe between the fitting and the toilet tank back to a pipe feeding the fitting after pressure is removed therefrom. Such a bypass pipe, including a one-way check valve is rather cumbersome to use, labor intensive to construct and adds considerable weight to an aircraft. Therefore, it is an object of this invention, to provide an aircraft toilet tank filling valve assembly which does not retain residue water, which is relatively easy to construct, install and use and which does not add undue weight to an aircraft.

SUMMARY

According to principles of this invention, an aircraft toilet tank filling valve assembly comprises an elongated main body for defining an elongated passage and two lateral, longitudinally spaced, passages and a one piece bypass casing defining a bypass channel open on one elongated side of the bypass casing to join the lateral passages of the main body. A one-way valve is placed at the interface of the elongated main body to the bypass casing for allowing fluid to flow from the first lateral passage to the bypass channel, but for not allowing flow in the reverse direction. In the preferred embodiment, the one-way valve is constructed of a gasket which is used for sealing the one piece elongated bypass casing to the elongated main body.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE PREFERRED EMBODIMENT

Figure 1:
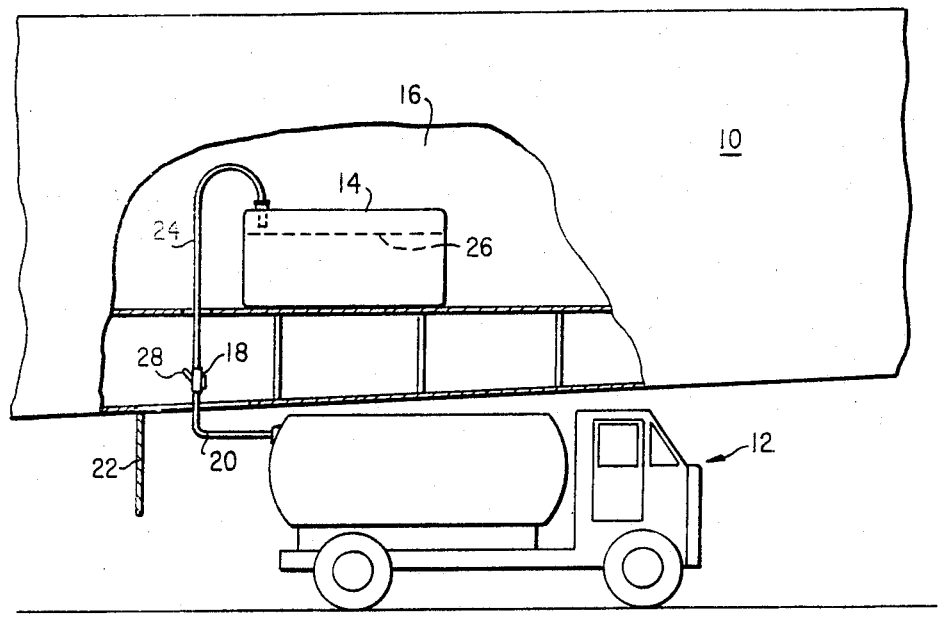
FIG. 1 is a schematic, segmented, partially cutaway side view of an aircraft and service truck at an airport, the service truck filling a toilet tank of the aircraft.

In FIG. 1, an aircraft 10 is being serviced by a service truck 12 at an airport. In this respect, a toilet tank 14 located in a heated compartment 16 is being filled via a fitting 18 to which a hose 20 of the service truck 12 is coupled. An operator of the service truck 12 gains access to the fitting 18 via a service door 22 in the aircraft 10 and couples the hose 20 with a quick disconnect connection to the fitting 18. He then applies pressurized toilet fluid through the hose 20, the fitting 18, and piping 24 into the toilet tank 14. Once the toilet tank 14 is full it is desirable to discontinue flow of toilet fluid 26 thereto, thus, a valve actuator 28 of the fitting 18 is moved to close a valve and fluid flow to the toilet tank 14 is terminated. Thereafter, the operator deactivates the pressurizing source of the pressurized fluid passing through the hose 20 and the hose 20 is disconnected from the fitting 18. Unfortunately, toilet fluid remains in the piping 24 and in the upper end of the fitting 18, these members not being in heated compartments of the aircraft 10. Under certain conditions, these members become so cold that this toilet fluid freezes, which can damage the fitting 18 and the pipes 24.

Figure 2:
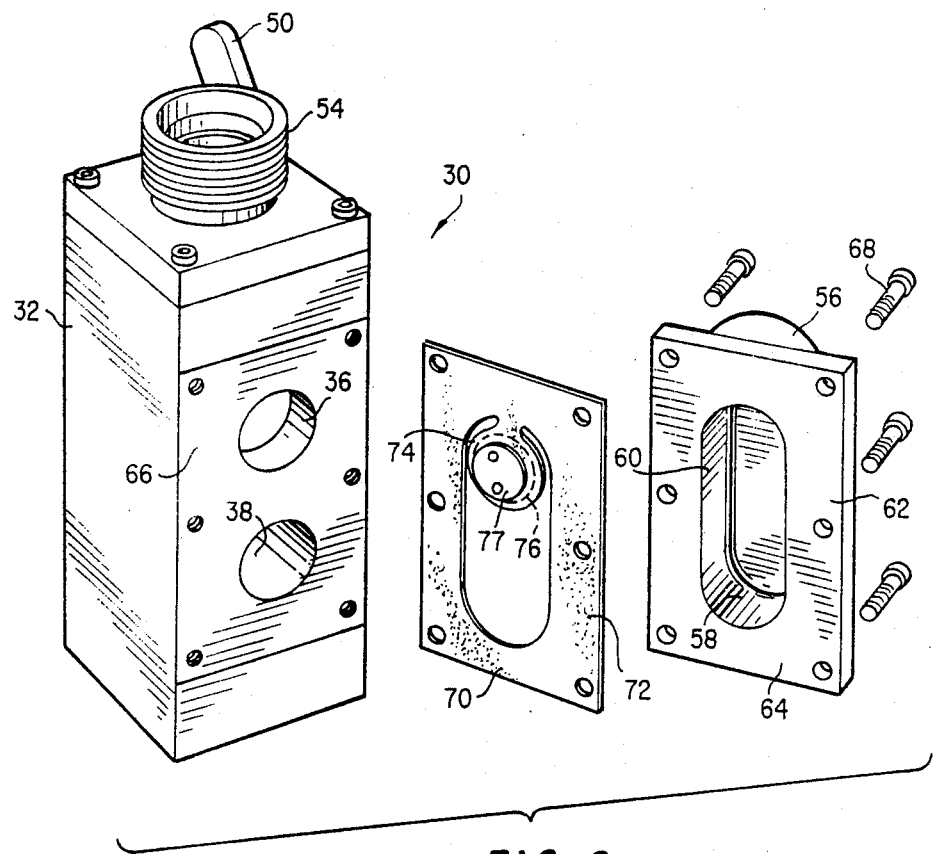
FIG. 2 is an exploded isometric view of an aircraft toilet tank filling valve assembly of this invention.

Such damage can be eliminated by using the aircraft toilet tank filling valve assembly 30 of FIG. 2.

Figure 3:
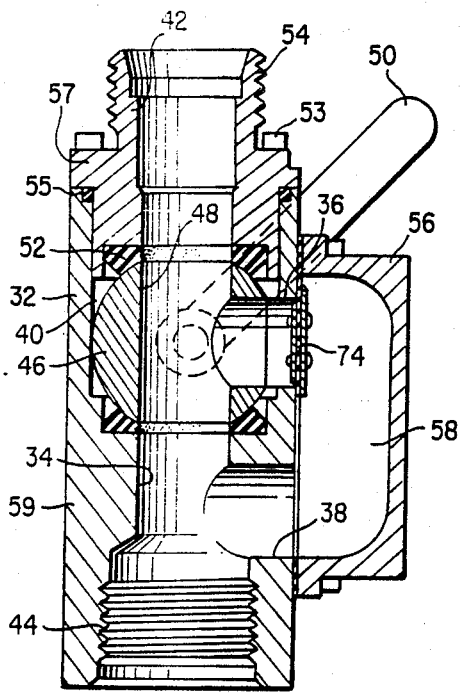
FIG. 3 is a side, cross sectional, view, of the aircraft toilet filling valve assembly of FIG. 2.
Figure 4:
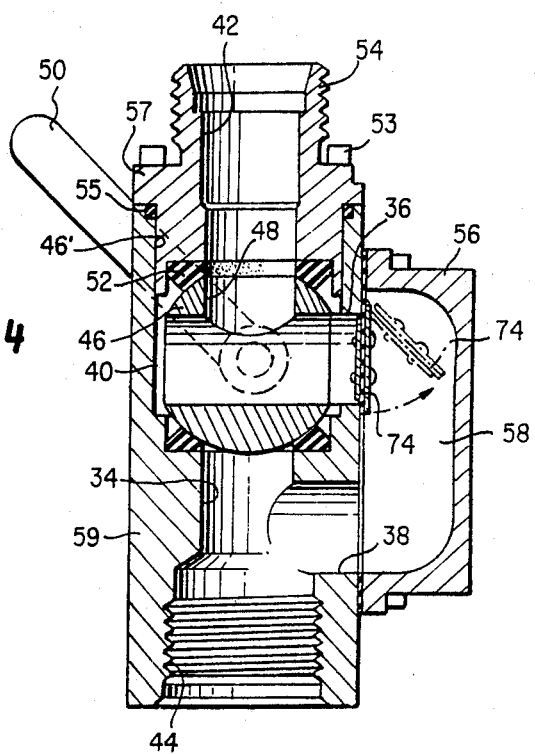
FIG. 4 is a view similar to FIG. 3, but with a rotary valve thereof being in a different position.

The filling valve assembly 30 comprises an elongated main body 32 defining an elongated passage 34, a first lateral passage 36, a second lateral passage 38, and a ball valve cavity 40. The elongated passage 34 has a first end 42 which is attached to the piping 24 and a second end 44 for receiving a quick disconnect fitting for the hose 20. The ball valve cavity 40 sealingly receives a rotatable ball valve 46 having a T-shaped passage 48 therethrough. In this regard, when in the FIG. 3 position, the T-shaped passage 48 has an opening to each of the first and second ends 42 and 44 of the elongated passage 34 as well as to the first lateral passage 36. In addition, there is a shaft opening (not shown) into the ball valve cavity 40 from outside the elongated main body 32 through which a shaft from actuator 50 engages the ball valve 46. The ball valve 46 can be moved from the position shown in FIG. 3 in which its T-shaped passage 48 aligns with the first and second ends 42 and 44 of the elongated passage 34 and the first lateral passage 36 to the position shown in FIG. 4 in which the T-shaped passage 48 only aligns with the first end 42 of the elongated passage 34 and the first lateral passage 36. The ball valve cavity 40 also includes spaces for seals 52 about the ball valve 46 as well as packing and/or seals about linkage (not shown) to the actuator 50. It should be noted that the elongated main body 32 is constructed primarily of one piece, although in the illustrated, preferred, embodiment an upper coupling member 54 is shown to be a separate first piece 57 which is piloted into an upper end of a cylindrically-shaped hollow 46' of a second piece 59. In this regard, the ball valve 46 and its seals 52 are mounted into the hollow 46' from the upper end of the second piece 59 and the first piece 57 is then piloted into the hollow 46'. The first piece 57 is screwed to the second piece 59 by screws 53 and sealing therebetween is provided by O-ring 55. Once the ball valve 46 is in the ball cavity 40, the actuator shaft (not shown), from the actuator 50, is extended through the shaft opening (not shown) to engage (by insertion into a slot, for example) the ball valve 46 for rotating it. It should be understood that appropriate retainers and seals are provided for properly mounting the actuator 50 and the actuator shaft (not shown) on the elongated main body 32.

Figure 5:
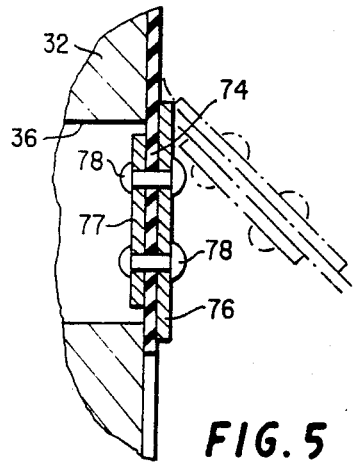
FIG. 5 is a cross sectional view showing structure of a one-way flap valve of this invention.

A one piece, elongated, bypass casing 56 forms an elongated channel 58 which is open at a bypass opening 60. The bypass casing 56 includes a flange 62 extending outwardly about the bypass opening 60 and having a smooth bypass-casing oblong sealing facing 64 thereon corresponding to a main-body oblong sealing facing 66 surrounding the first and second lateral passages 36 and 38. The flange 62 is screwed to the elongated main body 32 by means of screws 68 with the smooth sealing facings 64 and 66 placed adjacent one another with a gasket 70 therebetween. The gasket 70 includes an outer frame 72 and a one-way flap valve 74 with a larger metallic disk 76 attached on a non-seating side thereof and a smaller metallic disk 77 attached on a seating side to provide rigidity. The larger and smaller metallic disks 76 and 77 are held on by rivets 78 passing through the one-way flap valve 74 as shown in FIG. 5. With the gasket 70 mounted between the sealing facings 64 and 66, the flap valve 74 covers the first lateral passage 36 but pressure coming out of the first lateral passage 36 will tend to open the one-way flap valve 74, allowing fluid to flow into the elongated channel 58.

In operation of the aircraft toilet tank filling valve assembly 30, this assembly replaces the prior art fitting 18 shown in FIG. 1. The hose 20 from the service truck 12 is coupled to the second end 44 of the elongated passage 34 and toilet fluid is supplied thereto under pressure. The actuator 50 is moved to the FIG. 3, open, position so that toilet fluid flows under pressure through the elongated passage 34, through the piping 24 into the toilet tank 14. This toilet fluid cannot flow through the second lateral passage 38 and the elongated channel 58 of the bypass casing 56 because the one-way flap valve 74 will be driven to a seated position at the mouth of the first lateral passage 36 by the pressurized toilet fluid. However, once the toilet tank 14 is filled, the operator moves the valve actuator 50 in a counter-clockwise direction, as viewed in FIGS. 3 and 4, to move the spherical ball valve 46 to the position shown in FIG. 4. In this position, the T-shaped passage 48 of the ball valve 46 is no longer coupled to the second end 44 of the elongated passage 34, thus, toilet fluid can no longer flow directly through the elongated passage 34.

Thus, in this position, fluid can no longer flow from the second end 44 to the first end 42 of the elongated passage 34 because it cannot get past the spherical ball valve 46 and it cannot get past the one-way flap valve 74. However, once fluid pressure is eliminated from the second end 44 of the elongated passage 34, a head of toilet fluid above the spherical ball valve 46 presses the one-way flap valve 74 toward the right, as viewed in FIGS. 3 and 4, to thereby open the one-way flap valve 74. Thus, the toilet fluid located above the ball valve 46 flows through the first end 42 of the elongated passage 34, the T-shaped passage 48, the first lateral passage 36, the elongated channel 58, the second lateral passage 38, and finally out the second end 44 of the elongated passage 34. No substantial fluid is left in the piping 24 or in the filling valve assembly 30 for freezing and thereby possibly damaging these members.

It should be understood by those skilled in the art that the aircraft toilet tank filling valve assembly of this invention comprises basically two housing parts, a ball valve, and a gasket, and is therefore uncomplicated, relatively inexpensive to construct, and light in weight. In this regard, in the preferred embodiment, the elongated main body 32 is machined essentially as two pieces and the bypass casing 56 is machined as one piece.

While the invention has been particularly shown and described with reference to a preferred embodiment, it will be understood by those skilled in the art that various changes in form and detail may be made therein without departing from the spirit and scope of the invention. For example, it is not necessary that the elongated passage 34 be perfectly straight as shown in the drawings.

The embodiments of the invention in which an exclusive property or privilege are claimed are defined as follows:

1. Aircraft toilet tank filling valve assembly comprising:
    an elongated main body defining an elongated passage therethrough extending longitudinally from a first end to a second end of said main body, a first lateral passage extending laterally from said elongated passage to a bypass outer-surface side of said main body, and a second lateral passage extending laterally from said elongated passage to said bypass outer surface side of said main body, said second lateral passage being longitudinally spaced from said first lateral passage along said main body, said main body defining a smooth main-body oblong sealing facing on said bypass outer surface side surrounding said first and second lateral passages and a valve cavity at the intersection of said elongated passage and said first lateral passage for receiving a movable valve member and an actuator for allowing said movable valve member to be moved therein from outside said main body;
    a one piece, elongated bypass casing defining an elongated bypass channel being open at a bypass opening on one elongated side thereof, but otherwise being closed, said bypass casing defining a bypass casing oblong sealing facing corresponding to said main-body oblong sealing facing surrounding said bypass opening, said main-body and bypass-casing oblong sealing facings being shaped and sized such that they can be placed together with a gasket therebetween to form a seal, with said elongated channel forming a passage between said first and second lateral passages;

a movable valve member mounted in said valve cavity with a valve actuator extending outside said main body, said movable valve member defining valve passages such that when it is placed in a closed valve position it does not allow flow through said straight elongated passage, but does allow flow between a first end of said elongated passage and said first lateral passage and when it is placed in an open valve position it allows flow through said elongated passage as well as communication between said elongated passage and said first lateral passage;

a one-way check valve mounted at an interface between said main body and said bypass casing for allowing fluid to flow from said first lateral passage to said elongated passage, but not in the reverse direction;

whereby said aircraft toilet tank filling valve assembly can be mounted on an aircraft with said first end of said elongated passage coupled to an aircraft toilet tank and a second end of said elongated passage being accessible for attaching a source of pressurized toilet fluid thereto for filling said aircraft toilet tank when said movable valve member is in said open position, such that the flow of said toilet fluid to said aircraft toilet tank can be interrupted by actuating said valve actuator to move said movable valve member to said closed position, and after said toilet fluid pressure is removed from said second end of said elongated passage any toilet fluid remaining in a pipe extending between said valve assembly and said aircraft toilet tank is allowed to flow through said bypass channel out of said second end of said elongated passage.

2. Aircraft toilet tank filling valve assembly as in claim 1, wherein said one-way valve is integral with a gasket that is placed between the elongated main body and the elongated bypass casing.

3. Aircraft toilet tank filling valve assembly as in claim 2, wherein said elongated passage is substantially straight.

4. Aircraft toilet tank filling valve assembly as in claim 3, wherein said movable valve member is a ball valve with passages therethrough.

5. Aircraft toilet tank filling valve assembly as in claim 1, wherein said elongated passage is substantially straight.

6. Aircraft toilet tank filling valve assembly as in claim 5, wherein said movable valve member is a ball valve with passages therethrough.

7. Aircraft toilet tank filling valve assembly as in claim 1 wherein said elongated main body comprises a first part which is piloted longitudinally into a hollow of a second part to form said valve cavity.

8. Aircraft toilet tank filling valve assembly as in claim 7 wherein said hollow is cylindrically shaped.

* * * * *